United States Patent
Rigas

(10) Patent No.: US 12,061,764 B2
(45) Date of Patent: Aug. 13, 2024

(54) TOUCH PANEL, AND A METHOD AND APPARATUS FOR MANUFACTURING SUCH A TOUCH PANEL

(71) Applicant: M-SOLV LIMITED, Oxford (GB)

(72) Inventor: Grigorios-Panagiotis Rigas, Bicester (GB)

(73) Assignee: M-SOLV LIMITED, Oxford (GB)

( * ) Notice: Subject to any disclaimer, the term of this patent is extended or adjusted under 35 U.S.C. 154(b) by 0 days.

(21) Appl. No.: 17/781,221

(22) PCT Filed: Dec. 10, 2020

(86) PCT No.: PCT/GB2020/053161
§ 371 (c)(1),
(2) Date: May 31, 2022

(87) PCT Pub. No.: WO2021/123741
PCT Pub. Date: Jun. 24, 2021

(65) Prior Publication Data
US 2023/0026863 A1    Jan. 26, 2023

(30) Foreign Application Priority Data

Dec. 18, 2019    (EP) .................................. 19386058
Jan. 21, 2020    (GB) .................................. 2000871

(51) Int. Cl.
*G06F 3/044*        (2006.01)

(52) U.S. Cl.
CPC .. *G06F 3/0446* (2019.05); *G06F 2203/04103* (2013.01); *G06F 2203/04111* (2013.01); *G06F 2203/04112* (2013.01)

(58) Field of Classification Search
CPC ............................................ G06F 3/044–0448
See application file for complete search history.

(56) References Cited

U.S. PATENT DOCUMENTS

2012/0200527 A1*  8/2012  Rumsby ................ G06F 3/0446
                                                              345/174
2013/0135231 A1*  5/2013  Park ........................ G06F 1/16
                                                              345/173
(Continued)

FOREIGN PATENT DOCUMENTS

EP        2491482 A1    8/2012
EP        2799957 A1    11/2014
(Continued)

OTHER PUBLICATIONS

International Search Report and Written Opinion of the International Searching Authority issued in PCT/GB2020/053161, mailed Feb. 8, 2021; ISA/EP.

(Continued)

*Primary Examiner* — Hang Lin
(74) *Attorney, Agent, or Firm* — Harness, Dickey & Pierce, P.L.C.

(57) ABSTRACT

A touch panel comprising a transparent substrate and a layer of transparent conducting material on the transparent substrate, the layer of transparent conducting material being provided in a pattern comprising a plurality of electrode cells connected along a first direction and isolated from each other in the layer by gaps between the electrode cells in a second direction. A pattern of transparent insulating material is provided on the layer of transparent conducting material so as to provide bridging portions of the transparent insulating material that span across at least a subset of the gaps between the electrode cells in the second direction. The touch panel further comprises a plurality of transparent electrically conductive tracks, each comprising a plurality of at least one of nanowires, nano tubes and nanosheets. Each track is provided over a respective one of the bridging (Continued)

portions to electrically connect a respective two of the electrode cells.

18 Claims, 7 Drawing Sheets

(56) References Cited

U.S. PATENT DOCUMENTS

| | | | |
|---|---|---|---|
| 2013/0277197 A1* | 10/2013 | Mi | G06F 3/0445 |
| | | | 200/600 |
| 2015/0001060 A1* | 1/2015 | Kim | G06F 3/0445 |
| | | | 200/600 |
| 2015/0370374 A1 | 12/2015 | Chan | |
| 2016/0259447 A1* | 9/2016 | Lin | G06F 3/0446 |
| 2017/0075463 A1 | 3/2017 | Wang et al. | |

FOREIGN PATENT DOCUMENTS

| | | |
|---|---|---|
| WO | WO-2011018594 A2 | 2/2011 |
| WO | WO-2013063183 A1 | 5/2013 |
| WO | WO-2015164884 A1 | 10/2015 |

OTHER PUBLICATIONS

British Search Report regarding Application No. GB2000871.0 dated Aug. 28, 2020.
Hantang et al., "Fabrication and electrical characterization of multi-layer capacitive touch sensors on flexible substrates by additive e-jet printing," Journal of Manufacturing Processes, vol. 28, 2017, pp. 479-485.

* cited by examiner

TOUCH PANEL, AND A METHOD AND APPARATUS FOR MANUFACTURING SUCH A TOUCH PANEL

CROSS REFERENCE TO RELATED APPLICATIONS

This application is a U.S. National Phase Application under 35 U.S.C. 371 of International Application No. PCT/GB2020/053161 filed on Dec. 10, 2020, which claims the benefit of British Patent Application No. 2000871.0 filed on Jan. 21, 2020, and European Patent Application No. 19386058.2 filed on Dec. 18, 2019. The entire disclosures of the above applications are expressly incorporated by reference herein.

The present invention relates to improvements in touch panels and methods for the manufacture of touch panels, and is particularly applicable to capacitive touch panels.

Capacitive touch panel technology is in wide use, for example in mobile phones. One particular form of capacitive touch panel is known as projective capacitive touch technology or "PCT". In PCT devices, an XY array of sending electrodes is formed in layers of transparent conducting material. In use, capacitance forms between the user's fingers and the projected capacitance from the sensing electrodes. A touch is made, precisely measured and translated into a command which is executed by underlying electronic devices for an appropriate software application. PCT screens enjoy the benefits of responding accurately to both fingers and styli.

One particular form of PCT technology uses a single layer of transparent conducting material and it is the changes in the self-capacitance between separate areas in this layer that are detected. A convenient way to make such a single layer PCT device is to divide up the conducting layer into electrically separated areas that are then interconnected to form sets of orthogonal electrodes. Since the interconnections have to be conducting it is usual to form these with structures based on fine lines of metallic material. Whilst they do not obstruct viewing of images, present metallic based interconnect technologies reflect light and so are visible on close inspection of the screen and so the image quality as viewed by the user is impaired.

WO 2011/018594 describes a development to the PCT devices described in above, in which the interconnections are formed from a transparent material. This helps to improve the image quality by reducing the amount of reflected light. However, the transparent interconnections described in WO 2011/018594 nonetheless may not appear completely transparent.

Embodiments of the present disclosure aim to at least partially address one or more of the problems discussed above and/or other problems.

According to an aspect of the invention, there is provided a touch panel for a display, the touch panel comprising: a transparent substrate; a layer of transparent conducting material on the transparent substrate, the layer of transparent conducting material being provided in a pattern comprising a plurality of electrode cells, wherein the electrode cells are connected together within the layer along a first direction and are isolated from each other in the layer by gaps between the electrode cells in a second direction; a pattern of transparent insulating material on the layer of transparent conducting material, the pattern being such as to provide bridging portions of the transparent insulating material that span across at least a subset of the gaps between the electrode cells in the second direction; and a plurality of transparent electrically conductive tracks, each track comprising a plurality of at least one of nanowires, nanotubes and nanosheets, and wherein each track is provided over a respective one of the bridging portions of the transparent insulating material to electrically connect a respective two of the electrode cells across the gap between the electrode cells.

Thus, a touch panel is provided which advantageously uses a plurality of nanowires, nanotubes or nanosheets for each of the plurality of electrically conductive tracks. The plurality of electrically conductive tracks formed from the plurality of nanowires, nanotubes, or nanosheets is advantageous as the tracks may be more flexible, without significant compromise in conductivity or opacity, when compared to prior art touch panels which may comprise, for example, tracks formed from indium tin oxide (ITO). Tracks formed from ITO are known to be rigid, which can make them brittle and thus unsuitable for use in flexible touch panels. Through the use of conductive tracks formed from a plurality of nanowires, nanotubes or nanosheets, it may be possible for the touch panel to be flexible, or more flexible, when compared to prior art touch panels. Further, through the use of nanowires, nanotubes or nanosheets it may be possible to disperse the nanowires, nanotubes or nanosheets into a solvent thereby forming a functional ink which can be deposited onto the touch panel using an appropriate technique, for example printing. The touch panel may thus be formed more easily. The touch panels according to the invention may have improved perceived transparency and may be advantageous when compared to prior art touch panels which comprise metallic structures formed by photolithographic techniques which are often highly visible in reflected light.

Despite the use of transparent materials, due to the width of the tracks, it may sometimes be possible for a user to observe the tracks on the touch panel. According to another aspect of the invention, there is provided a touch panel comprising: a transparent substrate; a layer of transparent conducting material on the transparent substrate, the layer of transparent conducting material being provided in a pattern comprising a plurality of electrode cells, wherein the electrode cells are connected together within the layer along a first direction and are isolated from each other in the layer by gaps between the electrode cells in a second direction; a pattern of transparent insulating material on the layer of transparent conducting material, the pattern being such as to provide bridging portions of the transparent insulating material that span across at least a subset of the gaps between the electrode cells in the second direction; and a plurality of electrically conductive tracks, each track being provided over a respective one of the bridging portions of the transparent insulating material to electrically connect a respective two of the electrode cells across the gap between the electrode cells and wherein each track comprises a plurality of separated sub-tracks.

Thus, a touch panel is provided in which the perceived transparency of the electrically conductive tracks is improved by providing a plurality of separated sub-tracks. The separated sub-tracks may be less noticeable by an observer thereby improving the perceived transparency. In such embodiments the sub-tracks themselves need not necessarily be individually transparent. However, in some embodiments the electrically conductive tracks are transparent electrically conductive tracks. In such embodiments the individual sub-tracks are thus individually transparent. The combination of transparent electrically conductive tracks which themselves comprise a plurality of separated subtracks, which are individually transparent, may further improve the transparency of the tracks.

In an embodiment, for each of one or more of the tracks, the sub-tracks comprise at least three separated sub-tracks, and wherein the separation between sub-tracks in at least two pairs of adjacent sub-tracks is different. By providing a different separation between at least two pairs of adjacent sub-tracks, the perceived transparency may be further improved as a user may be less likely to notice the presence of the sub-tracks with an irregular separation between them.

In an embodiment, the transparent insulating material comprises material suitable for curing by exposure to ultraviolet radiation. This may be advantageous as it may mean that the transparent insulating material can be quickly cured during manufacture with an appropriate ultraviolet radiation source. This may increase the speed at which the touch panel can be produced.

According to another aspect of the invention, there is provided a method for providing a transparent interconnecting structure in a touch panel, the method comprising, onto a layer of transparent conducting material on the transparent substrate, the layer of transparent conducting material being provided in a pattern comprising a plurality of electrode cells, wherein the electrode cells are connected together within the layer along a first direction and are isolated from each other in the layer by gaps between the electrode cells in a second direction: depositing a pattern of transparent insulating material such as to provide bridging portions of the transparent insulating material that span across at least a subset of the gaps between the electrode cells in the second direction; and depositing a plurality of electrically conductive tracks, each track being provided over a respective one of the bridging portions of the transparent insulating material to electrically connect a respective two of the electrode cells across the gap between the electrode cells; wherein the depositing of the plurality of electrically conductive tracks is performed on a portion of the deposited pattern of transparent insulating material whilst at the same time the depositing of a further portion of the pattern of transparent insulating material is performed.

Thus, a method is provided in which the deposition of the pattern of transparent insulating material and the deposition of electrically conductive tracks is performed simultaneously on different parts of the substrate with the transparent conducting material thereon. Through the use of this method, the speed at which the interconnecting structures can be formed may be increased.

In an embodiment, the depositing of the pattern of transparent insulating material comprises a depositing a first bridging portion of transparent insulating material extending between two adjacent electrically isolated cells, followed by depositing a second bridging portion of transparent insulating material extending between another two adjacent electrically isolated cells, and wherein the depositing of the plurality of conductive tracks comprises depositing a first track on the first bridging portion of transparent insulating material, whilst the second bridging portion of transparent insulating material is being deposited. Accordingly, following the deposition of a first bridging portion, whilst the next bridging portion is being deposited, the electrically conductive track may be deposited on the first bridging portion. This process may then be repeated. In such embodiments, a run of bridging portions and electrically conductive tracks thereon may be achieved in a single pass over the substrate. This may facilitate rapid and efficient production of the touch panel.

In another embodiment, wherein the depositing of the pattern of transparent insulating material comprises depositing a first portion of the pattern of transparent insulating material to bridge adjacent electrically isolated cells of a first set of electrically isolated cells and depositing a second portion of the pattern to bridge adjacent electrically isolated cells of a second set of electrically isolated cells, and wherein the depositing of the plurality of conductive tracks comprises depositing a first set of tracks on the first portion of the pattern of transparent insulating material, whilst the second portion of the transparent insulating material is being deposited. In such embodiments, the method involves depositing a set of bridging portions, whilst the electrically conductive tracks are deposited on another, previously deposited, set of bridging portions. Once completed, this may be repeated and a further set of bridging portions may be deposited, whilst the conductive tracks are deposited on the set of bridging portions deposited in the previous run. Such an embodiment advantageously deposits both the electrically insulating material and the electrically conductive tracks simultaneously, thereby potentially speeding up the process. This method may also allow more time for the bridging portions to cure prior to deposition of the conductive tracks. This may improve the quality of the bridging portions.

According to another aspect of the invention, there is provided an apparatus for providing a transparent bridge interconnect structure in a touch panel, the apparatus comprising: means for holding a substrate with a layer of transparent conducting material thereon; a first deposition unit configured to deposit an insulating material; a second deposition unit configured to deposit an electrically conductive material; a position control means for adjusting the position of the first and second deposition units and the substrate relative to one another; and a controller configured to control operation of the first and second deposition units and the position control means such that the first and second deposition units are constrained to move together with one another relative to the transparent conducting layer, and wherein the controller is configured to control the first deposition unit and second deposition unit such that they both deposit their respective materials at the same time on different portions of the transparent conducting layer.

By constraining the first and second deposition units to move together with one another, and controlling them such that they deposit their respective materials at the same time on different portions of the transparent conducting layer, the speed at which the interconnect structure can be formed may be increased. The apparatus may also be capable of performing the method outlined above.

Embodiments of the invention will now be described, by way of example only, and with reference to the accompanying drawings, in which.

Figure 1:
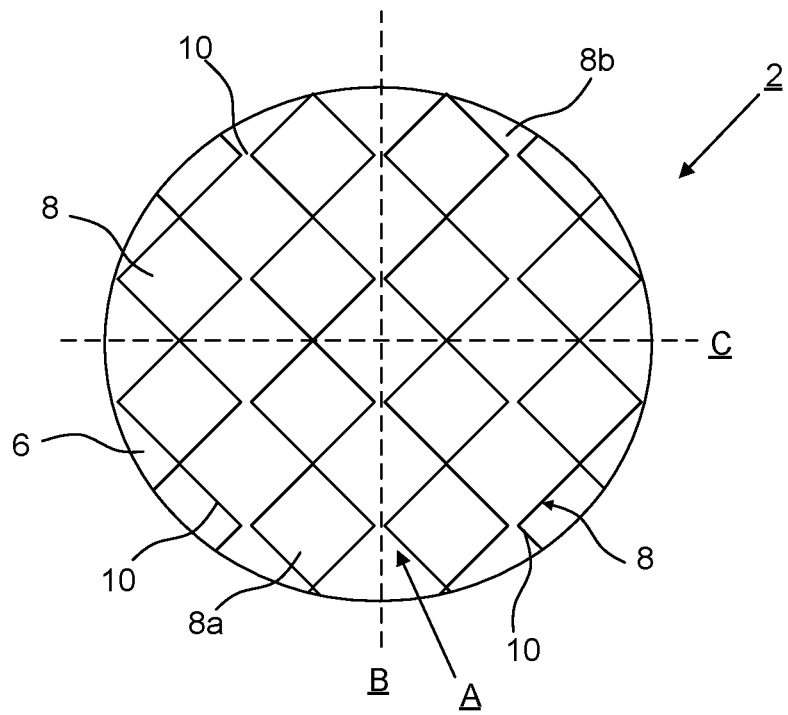
FIG. 1 shows a section of a touch panel without the pattern of transparent insulating material and transparent electrically conductive tracks thereon.
Figure 2:
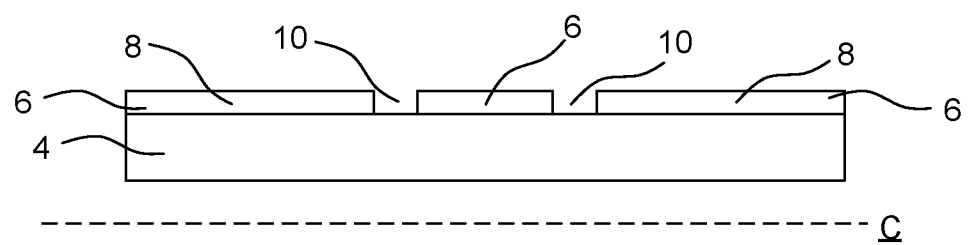
FIG. 2 shows a cross section through the touch panel seen in FIG. 1.

FIG. 1 shows a section of an embodiment of a touch panel 2 for a display, and FIG. 2 shows a cross section through the touch panel at the portion indicated by arrow A, when looking along the line B. Referring to FIGS. 1 and 2, the touch panel 2 comprises a transparent substrate 4 and a layer of transparent conducting material 6 on the transparent substrate 4. The layer of transparent conducting material 6 is provided in a pattern comprising a plurality of electrode cells 8. The transparent substrate 4 may, for example, comprise glass or plastic, and the transparent conducting material 6 may, for example, comprise indium tin oxide (ITO) or silver nanowires (AgNW). Any other suitable transparent conducting material may also be used. The transparent substrate 4 may be a thin film, for example having a thickness of 50 microns or less, and may be highly transparent. For example, the film may be made from cyclic olefin polymers (COP). Such a transparent substrate 4 formed of a thin film may provide a flexible touch panel 2. The electrode cells 8 are connected together within the layer 6 along a first direction, indicated by dashed line B, and are isolated from each other in the layer 6 by gaps 10 between the electrode cells 8 in a second direction, indicated by dashed line 10. The electrode cells 8 may be formed by a lithographic process used to remove lines of material to form the gaps 10. This results in columns of electrically isolated electrode cells 8a and columns of electrically connected electrode cells 8b. The plurality of electrode cells 8 may be formed by any suitable means.

Figure 3:
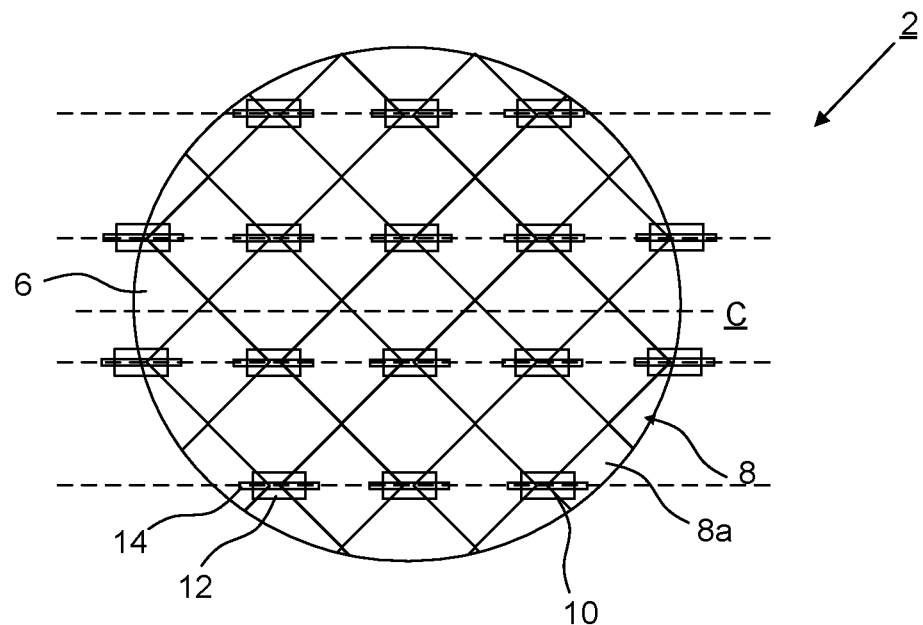
FIG. 3 shows the touch panel of FIG. 1 with the pattern of transparent insulating material and transparent electrically conductive tracks provided thereon.
Figure 4:
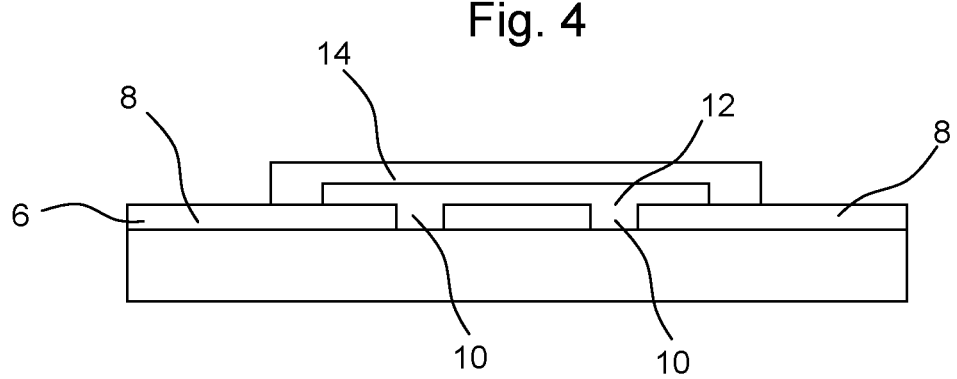
FIG. 4 shows a cross section through the touch panel shown in FIG. 3.

FIGS. 3 and 4 show the touch panel 2 seen in FIGS. 1 and 2 further including a pattern of transparent insulating material on the layer of transparent conducting material 6. The pattern of insulating material is such as to provide bridging portions 12 of the transparent insulating material that span across at least a subset of the gaps 10 between the electrode cells 8 in the second direction indicated by dashed line C. In this embodiment, the bridging portions 12 are discrete bridging portions 12 which only bridge two adjacent electrode cells 8. In some embodiments, the transparent insulating material comprises material suitable for curing by exposure to ultraviolet radiation. In some embodiments, the insulating material is a dielectric material.

Further, as can be seen in FIGS. 3 and 4, the device 2 comprises a plurality of transparent electrically conductive tracks 14 comprising metallic nanowires, each track 14 being provided over a respective one of the bridging portions 12 of the transparent insulating material so as to electrically connect a respective two of the electrode cells 8 across the gap 10 between the electrode cells. The connection of two adjacent electrode cells 8, which are otherwise isolated due to the gaps 10, with the tracks 14 can be seen most clearly in FIG. 4. The bridging portions 12 and plurality of tracks 14 together form a plurality of interconnecting structures between the electrode cells 8.

Figure 5:
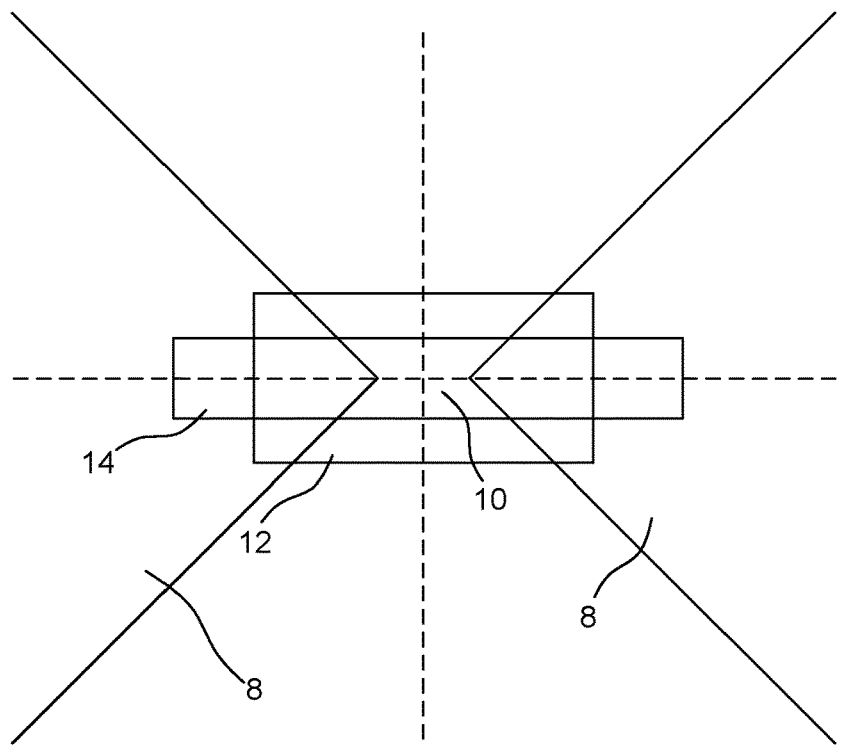
FIG. 5 shows a view focussing on one of the bridging portions with the electrically conductive track thereon.

FIG. 5 shows a close-up view focussing on one bridging portion 12 and corresponding transparent electrically conductive track 14. In this embodiment the transparent electrically conductive track 14 comprises a plurality of at least one of nanowires, nanotubes or nanosheets. As discussed above, the use of a plurality of at least one of nanowires, nanotubes or nanosheets is advantageous as it means that the transparent electrically conductive track may have improved flexibility. This may be particularly beneficial as the touch panel may thus be used as a flexible touch panel with improved flexibility. The nanowires, nanotubes or nanosheets may be metallic.

Figure 6:
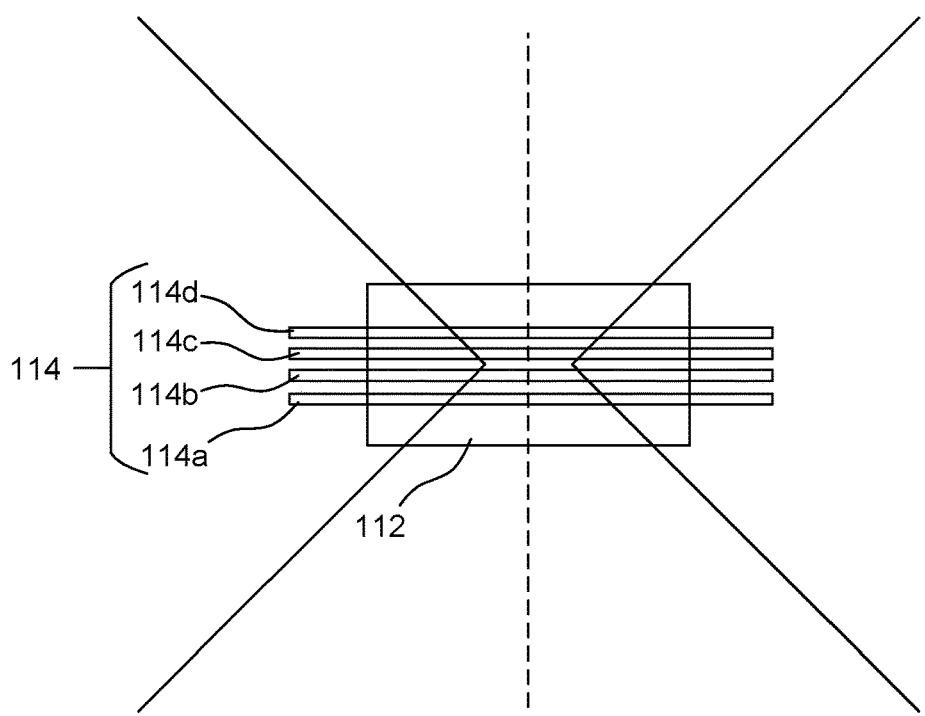
FIG. 6 shows a view focussing on one of the bridging portions wherein the track comprises a plurality of sub-tracks.

The conductive track 14 may be a single track 14 as depicted in FIG. 5 and comprise a plurality of at least one of nanowires, nanotubes or nanosheets. The single track 14 may comprise, consist essentially of, or consist of, nanowires and nanotubes, nanowires and nanosheets, or nanotubes and nanosheets. However, as depicted in FIG. 6, in some embodiments, the conductive track 114 track provided over the respective one of the bridging portions 112 comprises a plurality of separated sub-tracks 114a-114d. These separated sub-tracks 114a-114d need not necessarily individually be transparent. Instead, the sub-tracks 114-114d may be provided by an electrically conductive material which is not transparent. In this case, the transparency may be achieved by appropriate dimensions and spacing of the sub-tracks. Accordingly, referring back to FIG. 6, the sub-tracks 114a-114d which are provided over a respective one of the bridging portions 12 of the transparent insulating material to electrically connect a respective two of the electrode cells 8 across the gap 10 between the electrode cells 8 may not necessarily be made from a transparent material. Through the use of separated sub-tracks 114a-114d perceived transparency of the underlying structure may be achieved, or improved, as the separation of the sub-tracks 114a-114d may result in the sub-tracks 114a-114d not being easily observable by a user.

Despite the possibility of the sub-tracks 114a-114d not being transparent themselves, in some embodiments the sub-tracks 114a-114d may also be transparent, i.e. the sub-tracks may be formed from a transparent electrically conductive material. In such embodiments, the electrically conductive tracks may comprise a plurality of at least one of nanowires, nanotubes and nanosheets. Each of the sub-tracks 114a-114d may comprise a plurality of at least one of nanowires, nanotubes and nanosheets. Each of the sub-tracks 114a-114d may comprise, consist essentially of, or consist of, nanowires and nanotubes, nanowires and nanosheets, or nanotubes and nanosheets. The combination of both a transparent material and tracks which comprise a plurality of sub-tracks may further improve the perceived transparency of the touch panel. In any embodiments comprising nanowires and/or nanotubes, the nanowires may comprise silver nanowires and the nanotubes may comprise carbon nanotubes. In embodiments comprising nanosheets, the nanosheets may comprise graphene. The use of silver nanowires or carbon nanotubes or graphene nanosheets may be advantageous as silver and carbon are more abundant than some other materials such as, for example, indium.

In the embodiment shown in FIG. 6, for each of one or more of the tracks 114, the separation between each pair of adjacent sub-tracks 114a-114d is between 50% and 250%, e.g. between 100% and 200%, of a width of each sub-track 114a-114d of the pair. However, the separation between each pair of adjacent sub-tracks 114a-114d may be different and be dependent on the particular application. The separation between the adjacent sub-tracks may be chosen such that the track as a whole appears transparent. Further, in some embodiments, and as depicted in FIG. 6, the four sub-tracks 114a-114d each have a uniform separation, that is the spacing between each adjacent sub-track 114a-114d is the same.

Figure 7:
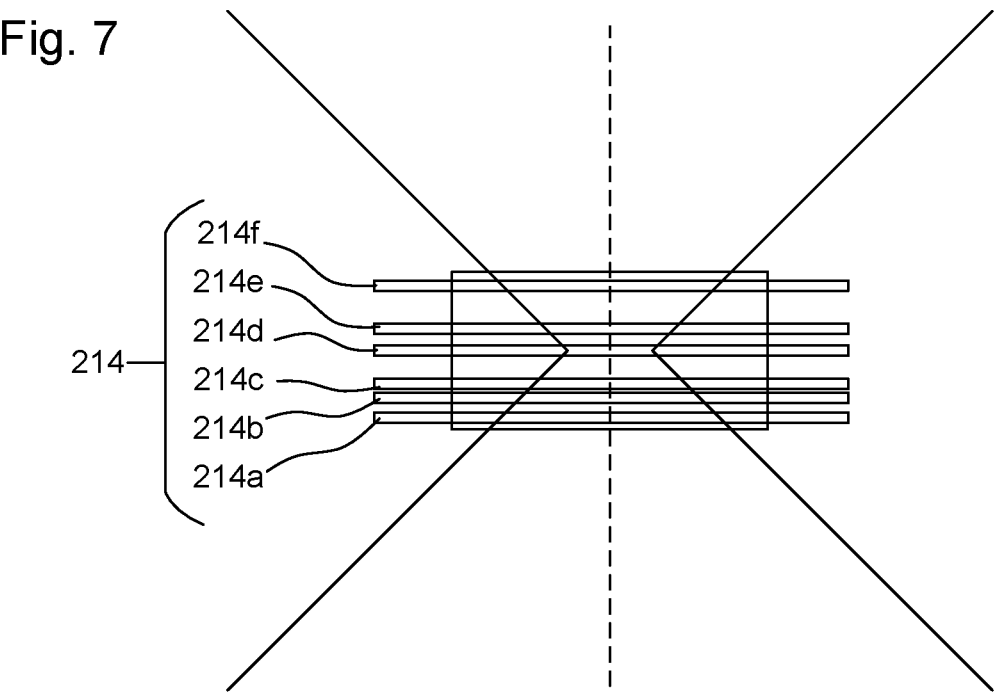
FIG. 7 shows a view focussing on one of the bridging portions wherein the track comprises a plurality of sub-tracks which have varying separation.

However, the track 114 may comprise any number of sub-tracks and the sub-tracks need not necessarily have uniform separation. In some embodiments, as depicted in FIG. 7, for each of one or more of the tracks 214, the sub-tracks comprises at least three separated sub-tracks, in this example six sub-tracks 214a-214f. As illustrated, the separation between sub-tracks 2144a-214f in at least two pairs of adjacent sub-tracks 214a-214f is different. For example, the separation between sub-track 214f and 214e is larger than the separation between sub-track 214e and 214d. Sub tracks 214a-214f in which the separation therebetween is non-uniform may further improve the perceived transparency of the track 214 as it may be harder for a user to distinguish the sub-tracks 214a-214f when there is no apparent pattern in their arrangement. In some embodiments, for each of one or more of the tracks 214, the separation between sub-tracks 214a-214f in every pair of adjacent sub-tracks 214a-214f is different. This is the case for the embodiment shown in FIG. 7. This may further improve the perceived transparency for the same reason as outlined above.

Figure 8:
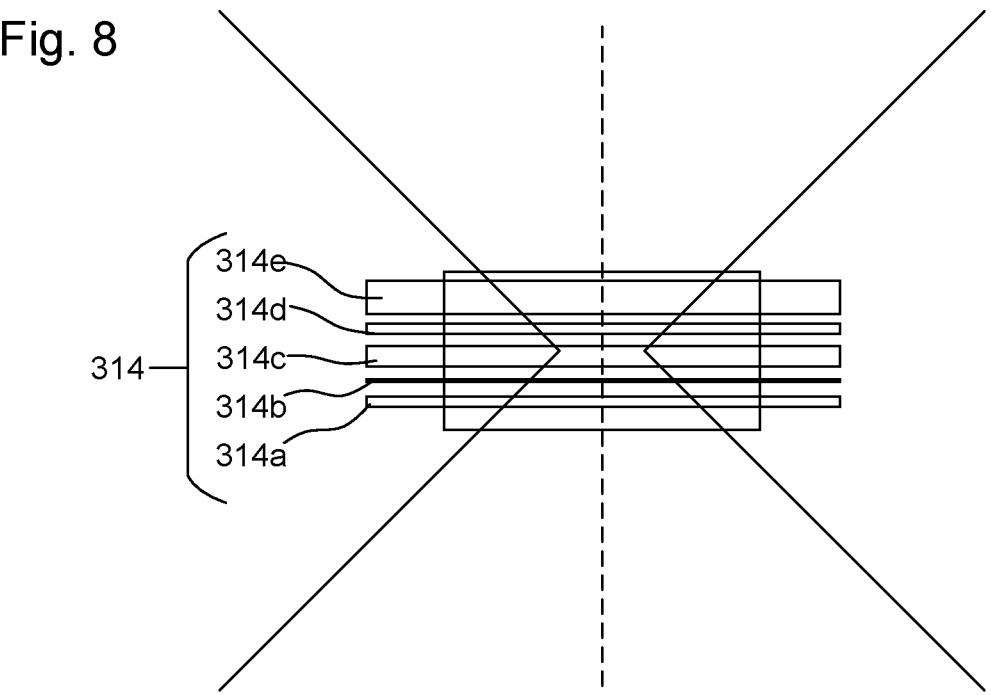
FIG. 8 shows a view focussing on one of the bridging portions wherein the track comprises a plurality of sub-tracks some of which have different widths.

In some embodiments, the sub-tracks 214a-214f each have the same width, wherein the width is defined as the extent of the sub-tracks 214a-214f in the direction illustrated by the dashed line in FIG. 7. However, this is not essential and in some embodiments, at least some of the sub-tracks may have different widths. FIG. 8 illustrates an embodiment where this is the case in which the track 314 comprises five sub-tracks 314a-314e. Sub-tracks 314a and 314d have the same width, whereas the other sub-tracks 314b, 314c and 314e have different widths. In some embodiments all of the sub-tracks may have different widths. Similarly to the use of different separations described above, the use of tracks 314a-314e wherein at least some have different widths may also improve the perceived transparency. The difference in widths may make it harder for an observer to distinguish the individual sub-tracks 314a-314e, thus improving the perceived transparency.

Figure 9:
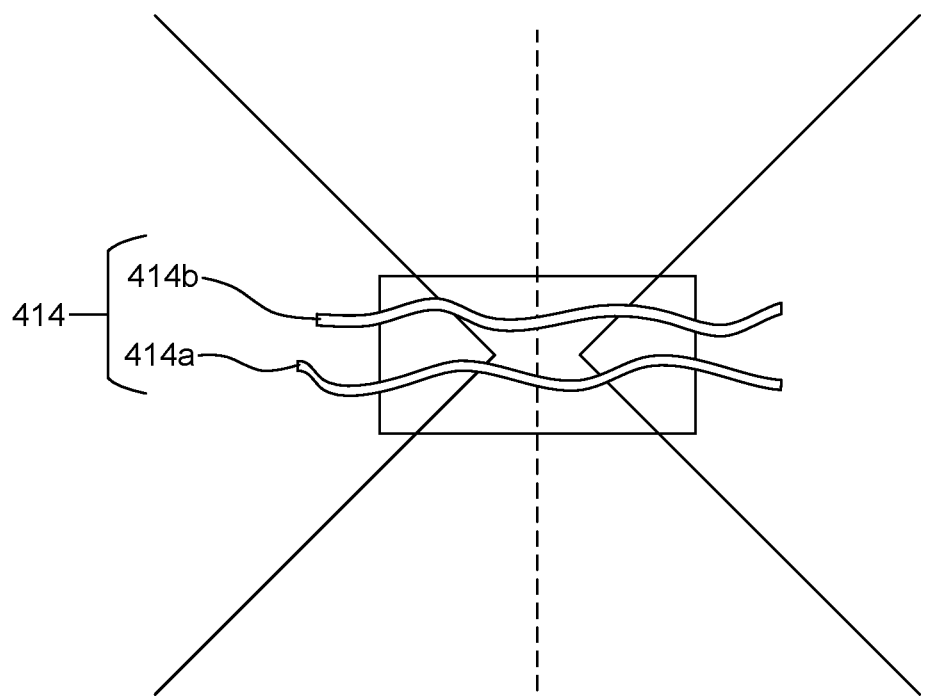
FIG. 9 shows a view focussing on one of the bridging portions wherein the track comprises a plurality of curved sub-tracks.

As exemplified in FIG. 9, in some embodiments the tracks 414 comprises curved sub-tracks 414a, 414b. In the embodiment shown, each of the curved tracks 414a, 414b, follows a different profile (i.e. has a different shape and/or follows a different path, relative to other sub-tracks of the same track). In some embodiments each curved track 414a, 414b follows the same profile (i.e. has the same shape and/or follows the same path, relative to other sub-tracks of the same track). Again, the use of curved tracks 414a, 414b may make it harder for a user to notice the presence of the sub-tracks 414a, 414b, and thus improve the perceived transparency of the track 414.

In some embodiments the tracks may have a width in the range of 50 microns to 500 microns. In embodiments wherein the tracks comprise sub-tracks, there may be any number of sub-tracks. In some embodiments, the sub-tracks may have a width in the range of 50 microns to 150 microns. In some embodiments the tracks may comprise be 2-10 sub-tracks, e.g. 3-7 sub-tracks. However, the tracks may comprise any number of sub-tracks which, with the number of sub-tracks potentially being dependent on the particular application of the touch panel, the conductivity of the material forming the sub-tracks and the desired characteristics thereof.

In some embodiments the touch panel may be rigid or flexible. The rigidity of the touch panel may be determined by the substrate. For example, a rigid touch panel may be achieved using a rigid substrate and a flexible touch panel may be achieved using a flexible substrate.

Figure 10:
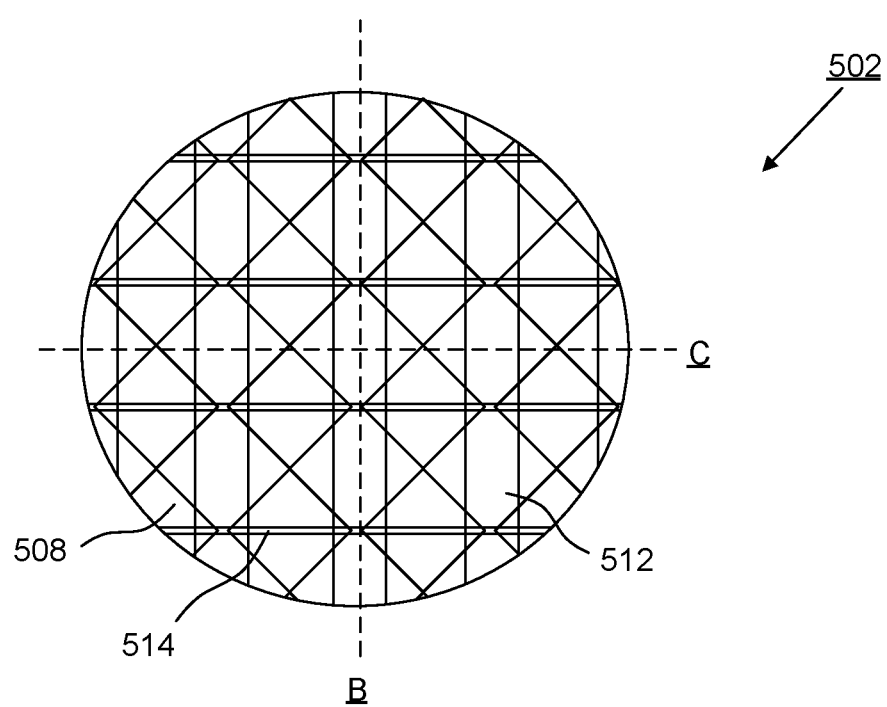
FIG. 10 shows a section of a touch panel in which the bridging portions and tracks are continuous.

In the embodiments described above, both the bridging portions and the electrically conductive tracks are discrete and only extend between two adjacent electrode cells. FIG. 10 depicts an alternative embodiment of the geometry of the bridging portions and the electrically conductive tracks. The pattern of transparent insulating material comprises a plurality of continuous bands 512 which extend continuously along the direction indicated by dashed line B, thereby providing bridging portions for a number of electrode cells 508. Further, the plurality of electrically conductive tracks comprise a plurality of continuous tracks 514 which extend continuously along the direction indicated by dashed line C. Alternatively, either one of the bridging portions or tracks may be made of discrete portions and the other as continuous bands/tracks. Such embodiments may be advantageous as it may be easier and quicker to deposit the electrically insulating material and/or the electrically conductive material in a continuous manner so as to form continuous bands 512 and/or continuous tracks 514.

Figure 11:
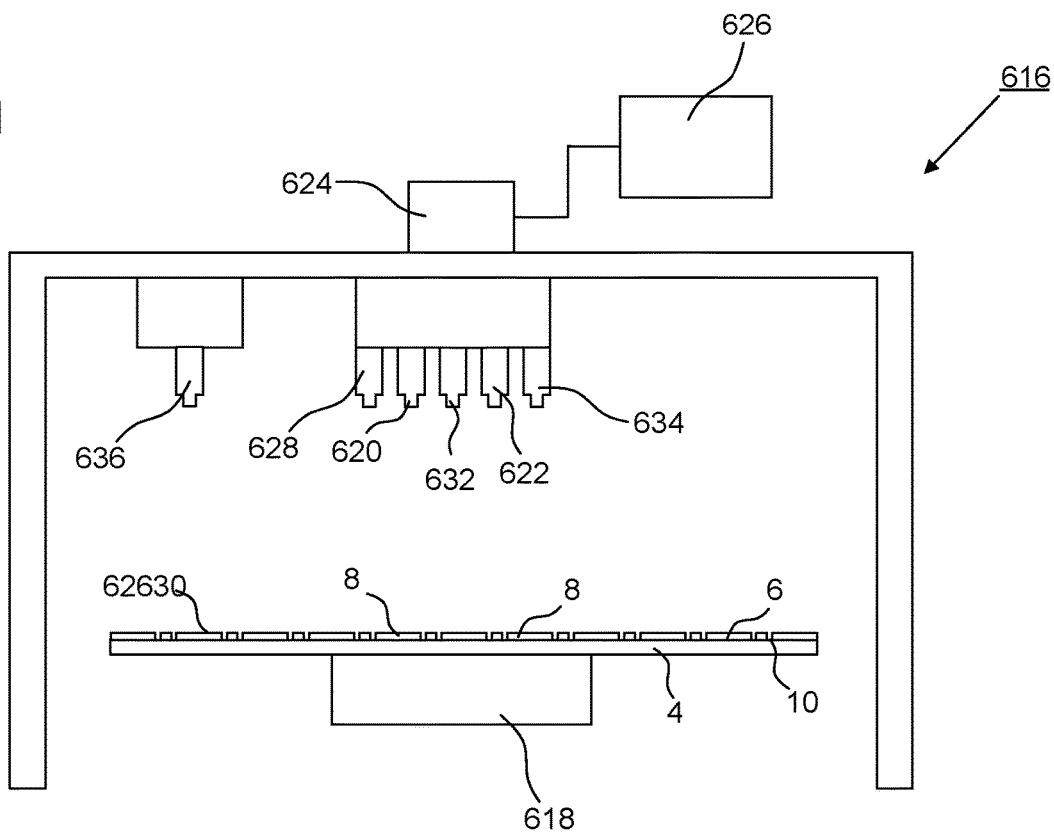
FIG. 11 shows a schematic view of an apparatus for forming a transparent interconnecting structure in a touch panel.

FIG. 11 shows an embodiment of an apparatus 616 for providing a transparent interconnect structure in a touch panel, for example of the type described in the embodiments above. The apparatus 616 will be described with reference to the manufacture of the touch panel 2 seen in FIGS. 1-4. However, the apparatus 616 may be used in the production of any of the touch panels described above.

The apparatus 616 comprises a means for holding 618 the substrate 4 with the layer of transparent conducting material 6 thereon. In this embodiment the layer of conducting material 606 is already divided into a number of electrode cells 608 by the gaps 10. This may be achieved using a separate apparatus not shown. The apparatus 616 comprises a first deposition unit 620 configured to deposit an insulating material and a second deposition unit 622 configured to deposit an electrically conductive material. The second deposition unit 622 may be configured to deposit an electrically conductive material or a transparent electrically conductive material depending on the specific touch panel being formed. The transparent electrically conductive material may comprise a plurality of at least one of electrically conductive nanowires, nanotubes and nanosheets.

A position control means 624 is provided for adjusting the position of the first 620 and second deposition units 622 and the substrate 4 relative to one another. Relative movement of the first and second deposition units 620, 622, or indeed any of the units discussed in more detail below, relative to the substrate 4 with the transparent electrically conductive layer 6 thereon may be achieved through any suitable means. For example, in some embodiments the substrate 4 may be held stationary and the various units may be moved relative to the substrate 4. In other embodiments, the various units may remain stationary and the substrate 604 may be moved relative to the units. In further embodiments, both the substrate 604 and the units may be moved.

The apparatus 616 further comprises a controller 626 configured to control operation of the first 620 and second deposition units 624 and the position control means 624 such that the first 620 and second deposition units 622 are constrained to move together with one another relative to the transparent conducting layer 6. The controller 626 is configured to control the first deposition unit 620 and second deposition unit 622 such that they both deposit their respective materials at the same time on different portions of the transparent conducting layer 6. This will be described further with respect to FIG. 12.

The first unit 620 may be any unit capable of depositing a transparent insulating material. In some embodiments the first unit 620 comprises an ink-jet printing unit. In such embodiments the transparent insulating material may be deposited in the form of an ink. Similarly, the second unit 622 may be any unit capable of depositing an electrically conductive material. In some embodiments the second unit 22 comprises a nozzle and a means for forcing the electrically conductive material through the nozzle. The means for forcing the electrically conductive material through the nozzle may comprise a pressure or mechanically driven syringe. The means for forcing the electrically conductive material may also comprise an auger or a piezo actuated pump. The second unit 622 may also be capable of depositing by ink-jetting.

In some embodiments, the apparatus further comprises a surface processing unit 628 configured to process the surface 30 of the transparent conducting layer 6. The controller 626 may be configured to control the surface processing unit 628 such that at least a portion of the surface 30 is processed prior to deposition of the transparent insulating material thereon. In addition, or alternatively, in some embodiments the surface processing unit 628, or an additional surface processing unit, may be configured to process the deposited transparent insulating material, prior to deposition of the electrically conductive material. In some embodiments, the surface processing unit 628 may be used to clean the surface 30 of the transparent conducting layer 6, which may also include the surface of the substrate 4 where the transparent conducting layer 6 is not present, i.e. in the gaps 10, and/or a surface of the deposited transparent insulating material. This cleaning may be achieved through any suitable means, for example through the use of a plasma directed towards the surface 30, or through cleaning via physical contact, e.g. with a rotating brush. Cleaning the surface may improve the adhesion of the electrically insulating and electrically conductive layers.

In some embodiments, the apparatus further comprises a curing unit 632 configured to cure a portion of the transparent insulating material deposited by the first unit 620. Similarly to the other units, in such embodiments the controller 626 is configured to control the curing unit 632 so as to operate following deposition of the transparent insulating material by the first unit 620, but prior to deposition of the electrically conducting material, on any given portion of the transparent conductive layer 606 on the substrate 604. Through the use of a curing unit 632, it may be possible to speed up the deposition process by reducing the time taken for the transparent insulating material to cure. This may increase the rate at which the touch panel can be manufactured and enable the deposition process achieved by the apparatus 616. The curing unit 632 may comprise any such unit that is capable of curing the deposited insulating material. In some embodiments the curing unit 632 comprises an ultraviolet radiation source configured to direct ultraviolet radiation towards the transparent insulating material. The use of a ultraviolet radiation source may be particularly well suited to rapidly curing the transparent insulating material. This may be particularly advantageous in embodiments in which the electrically conductive material is deposited on a portion of the electrically insulating layer which has been deposited immediately preceding deposition of the electrically conductive layer.

In some embodiments, the apparatus 616 comprises a drying unit 634 configured to dry a portion of the transparent electrically conductive material deposited by the second unit 622. In such embodiments the controller 626 is configured to control the drying unit 634 so as to operate following deposition of the electrically conductive material by the second unit 620. The drying unit 634 may comprise an infrared radiation source configured to direct infrared radiation towards the electrically conductive material. The drying unit 634 may also comprise a means for generating and directing heated air towards the electrically conductive material to accelerate the drying thereof. As with the curing unit 632 discussed above, the drying unit 634 may also facilitate rapid deposition of successive bridging portions and electrically conductive tracks.

Depending on the particular pattern of the transparent insulating material and the extent of the electrically conductive tracks, in some embodiments the controller 626 may also controller one or both of the curing unit 632 and drying unit 634 to operate at the same time as one or both of the first and second deposition units 620, 622.

In the embodiment of the apparatus 616 described above with respect to FIG. 11, the layer of electrically conductive material 6 on the substrate 4 is pre-divided into a plurality of electrode cells 8. This may for example be performed by a separate piece of apparatus which is specifically intended for this purpose. However, in some embodiments the apparatus 616 further comprises a laser unit 636 which is configured to form to a plurality of discrete electrode cells 8, which are electrically connected in a first direction but electrically isolated in a second direction, by means of laser cutting. The inclusion of such a laser unit 636 as part of the apparatus 616 may further increase the speed, and efficiency, of manufacture of a touch panel, by integrating the processing of the substrate 4 with the electrically conductive layer 6 thereon into a single apparatus.

As described above, the various components of the apparatus 616 may be combined together into a single piece of apparatus 616 as depicted. This may advantageously reduce the number of pieces of independent apparatus required to form a touch panel, which may also reduce the capital expenditure required to be able to produce such touch panels.

Figure 12:
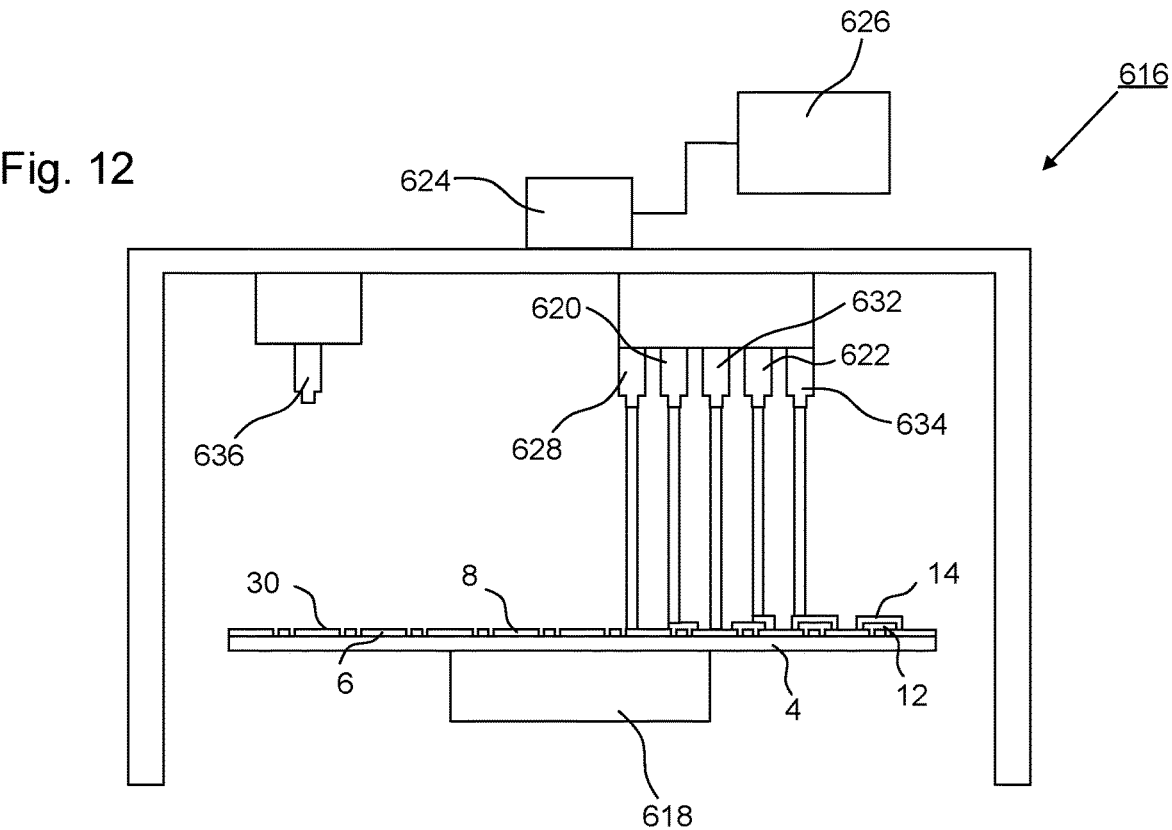
FIG. 12 shows a schematic view of the apparatus of FIG. 11 in operation.

As depicted in FIG. 12, the position control means 624 may be configured, for example, to move the various units from right to left relative to the substrate 4. In embodiments comprising a surface processing unit 628, this may be operated first to process a portion of the surface 30 prior to deposition of the transparent insulating material which forms the bridging portions 12. Following this, the first deposition unit 620 may be operated to deposit the transparent insulating material to form the bridging portions 12. In embodiments which comprise a curing unit 632, the curing unit 632 may then cure the transparent insulating material. The second deposition unit 622 may then deposit the electrically conductive material on the bridging portions 12 deposited by the first deposition unit 620. As can be seen in FIG. 12, whilst the first unit 620 is depositing the transparent insulating material on a first portion of the transparent conducting layer 8, the second deposition unit 622 is, at the same time, depositing the electrically conductive material on a second portion, i.e. a bridge 12, already deposited by the first unit 620. In embodiments which comprise a drying unit 634, the drying unit 634 may then be used to dry the deposited electrically conductive material 14.

The apparatus 616 may be used to form any of the touch panels discussed above with respect to FIGS. 1-10. The different embodiments, for example those including subtracks, sub-tracks with different separations, or curved sub-tracks, may be achieved through appropriate control of the various units by the controller 626 and/or through suitably designed units. For example, in embodiments whereby it is necessary for the second deposition unit 622 to deposit multiple sub-tracks, the second deposition unit 622 may be suitably configured for this purpose. For example, the second deposition unit 622 may comprise a number of sub-units each configured to deposit one of the sub-tracks. Alternatively, the controller 626 may cause the second deposition unit 622 to pass over the respective bridge portion multiple times and deposit, for example, one of the tracks on each pass. The same principle applies to the other units.

In embodiments of the invention there is provided a method for providing a transparent bridge interconnecting structure in a touch panel, for example of the type seen in FIGS. 1-10. This method may be performed using embodiments of the apparatus 616 described above with respect to FIGS. 11 and 12 and thus the method will be described with reference to FIGS. 11 and 12. However, the method may be performed using any suitable apparatus. The method involves starting with a layer of transparent conducting material 6 on a transparent substrate 4, the layer of transparent conducting material 6 being provided in a pattern comprising a plurality of electrode cells 8. The electrode cells 8 may be connected together within the layer along a first direction and be isolated from each other in the layer by gaps 10 between the electrode cells in a second direction. This can be seen most clearly in FIGS. 1 and 2. The method may comprise depositing a pattern of transparent insulating material such as to provide bridging portions 12 of the transparent insulating material that span across at least a subset of the gaps 10 between the electrode cells 8 in the second direction. The method then comprises depositing a plurality of electrically conductive tracks 14, each track 14 being provided over a respective one of the bridging portions 12 of the transparent insulating material to electrically connect a respective two of the electrode cells 8 across the gap 10 between the electrode cells 8. The depositing of the plurality of electrically conductive tracks 14 is performed on a portion of the deposited pattern of transparent insulating material whilst at the same time the depositing of a further portion, i.e. another bridging portion 12, of the pattern of transparent insulating material is performed. This can be seen, for example, in FIG. 12, wherein the bridging portions 12 are deposited at the same time as the electrically conductive tracks 14. The above described method may be used to produce any of the touch panels described above with respect to FIGS. 1-10.

Figure 13:
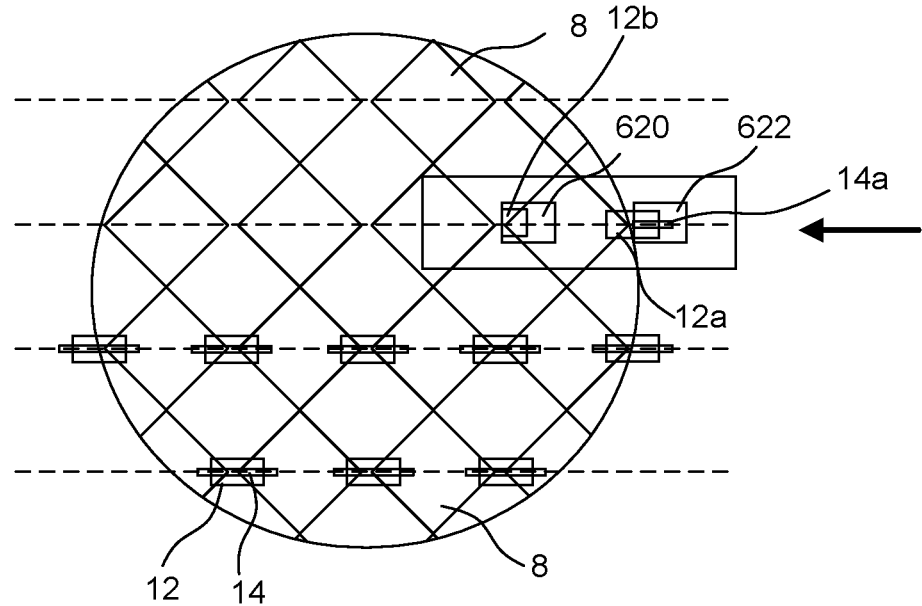
FIG. 13 shows an illustration of an embodiment of a method for forming the interconnecting structures.

FIG. 13 depicts an embodiment of a specific method for forming the interconnecting structures. In this embodiment, the depositing of the pattern of transparent insulating material comprises a depositing a first bridging portion 12*a* of transparent insulating material extending between two adjacent electrically isolated cells 8, for example using the first deposition unit 12. This is followed by depositing a second bridging portion 12*b* of transparent insulating material extending between another two adjacent electrically isolated cells 8. In this embodiment, the depositing of the plurality of conductive tracks 14 comprises the depositing of a first track 14*a* on the first bridging portion 12*a* of transparent insulating material, whilst the second bridging portion 12*b* of transparent insulating material is being deposited. This may be achieved by passing the first deposition unit 620 and second deposition unit 622 in the direction indicated by the arrow. This may facilitate the rapid production of the interconnecting structures and thus the touch panels. As large numbers of touch panels are typically produced for various applications, increasing the speed of production is particularly advantageous.

Figure 14:
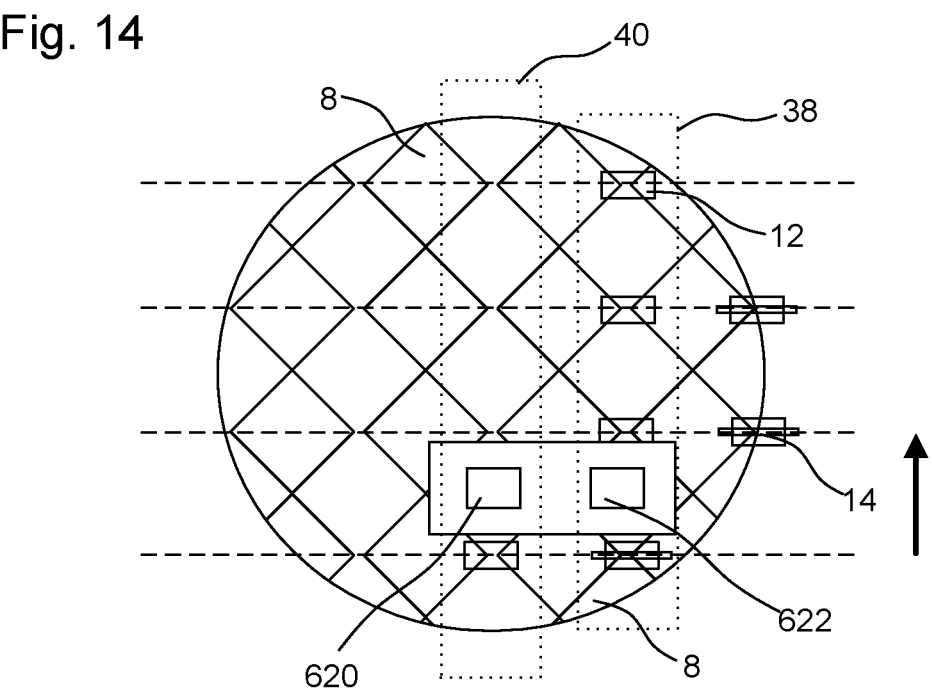
FIG. 14 shows an illustration of an embodiment of a method for forming the interconnecting structures.

FIG. 14 illustrates an alternative method for forming the interconnecting structures. In this embodiment, the depositing of the pattern of transparent insulating material comprises the depositing of a first portion of the pattern of transparent insulating material to bridge adjacent electrically isolated cells of a first set of electrically isolated cells 8. In the illustrated example, this first portion includes the four bridging portions 12 within the first dashed box 38. In this embodiment the method further includes depositing a second portion of the pattern to bridge adjacent electrically isolated cells 8 of a second set of electrically isolated cells. This second portion of the pattern includes the bridging portions 12 within the second dashed box 40. The depositing of the plurality of conductive tracks 14 comprises depositing a first set of tracks 14 on the first portion of the pattern of transparent insulating material, i.e. the bridging portions 12 within the first dashed box 38, whilst the second portion of the transparent insulating material is being deposited, i.e. whilst the bridging portions 12 within the second dashed box 40 are deposited. This may be achieved by passing the first deposition unit 620 and second deposition unit 622 in the direction indicated by the arrow. Similarly to the method described above, depositing the bridging portions 12 and electrically conductive tracks 14 in this manner may speed up the process for forming the interconnecting structures. Further, depositing in this manner may advantageously allow the bridging portions 12 more time to cure, prior to deposition of an electrically conductive track 14 thereon. This is facilitated as the electrically conductive tracks 14 are not immediately deposited onto a bridging portion 12 following its deposition, and are instead deposited once the set of bridging portions 12 have been deposited.

In some embodiments, the method may comprise curing at least a portion of the pattern of transparent insulating material, i.e. the bridging portions 12, prior to the deposition of the electrically conductive tracks 14. When the method is performed using the apparatus 616 seen in FIGS. 11 and 12, this curing may be performed by the curing unit 632. In some embodiments the curing comprises irradiating the pattern of transparent insulating material with ultraviolet radiation. The use of ultraviolet radiation for curing the transparent insulating material may prevent, or at least minimise, any damage to the underlying substrate. This may be achieved using a curing unit 632 which is configured to emit ultraviolet radiation.

In some embodiments the method comprises drying at least a portion of the electrically conductive tracks 14. This may be performed by any appropriate means, e.g. through the use of an infrared source, or by directing air towards the electrically conductive tracks. The air may be heated to further accelerate the drying. When the method is performed using the apparatus 616 seen in FIGS. 11 and 12, this may be achieved using the drying unit 634.

In some embodiments, the method comprises processing a surface of the transparent conducting layer 6 prior to deposition of the pattern of transparent conducting material. When the method is performed by the apparatus 616, this may be achieved using the surface processing unit 628.

In some embodiments, the plurality of electrically conductive tracks 14 may be transparent. In some embodiments, each of the plurality of electrically conductive tracks 14 may comprise a plurality of at least one of nanowires, nanotubes and nanosheets. Such nanowires or nanotubes may comprise silver nanowires or carbon nanotubes. The nanosheets may comprise graphene. However, the electrically conductive tracks 14 need not necessarily be formed from a transparent material. In some embodiments of the method, with reference to FIG. 6, depositing the plurality of electrically conductive tracks 114 comprises, for each bridging portion 112, depositing a plurality of separated sub-tracks 114a-114d. In such embodiments, as discussed above, whilst the sub-tracks 114a-114d may also be formed from a transparent material, the sub-tracks 114a-114d need not necessarily be formed from a transparent material.

With reference to FIGS. 1-4, 11 and 12, when the substrate 4 is provided with the transparent electrically conductive layer 6 thereon, but without the layer 6 being divided into a plurality of electrode cells 8 as described above, the method may further comprise dividing the transparent electrically conductive layer 6 into a plurality of electrode cells 8. This may be achieved by irradiating the layer with a laser. When such embodiments of the method are performed using the apparatus 616 seen in FIGS. 11 and 12, this formation of the plurality of electrode cells may be achieved using the laser unit 636, during the formation of the interconnecting structures. Again, this may reduce the time taken to manufacture a touch panel. Alternatively, the formation of the electrode cells 8 may be performed by a separate piece of apparatus prior to the formation of the interconnecting structures.

In any of the embodiments described above, the touch panels may be capacitive touch panels. In any of the embodiments described above, the electrode cells do not necessarily have to be square as depicted in the Figures. Instead, the electrode cells may have any suitable shape. For example, but without limitation, the electrodes may have lozenge, elongated lozenge or diamond shape.

PREFERRED EMBODIMENTS

Preferred embodiments of the disclosure are defined in the following number clauses.

1. A touch panel for a display, the touch panel comprising:
a transparent substrate;
a layer of transparent conducting material on the transparent substrate, the layer of transparent conducting material being provided in a pattern comprising a plurality of electrode cells, wherein the electrode cells are connected together within the layer along a first direction and are isolated from each other in the layer by gaps between the electrode cells in a second direction;
a pattern of transparent insulating material on the layer of transparent conducting material, the pattern being such as to provide bridging portions of the transparent insulating material that span across at least a subset of the gaps between the electrode cells in the second direction; and
a plurality of transparent electrically conductive tracks, each track comprising a plurality of at least one of nanowires, nanotubes and nanosheets, and wherein each track is provided over a respective one of the bridging portions of the transparent insulating material to electrically connect a respective two of the electrode cells across the gap between the electrode cells.

2. The touch panel of clause 1, wherein each track provided over the respective one of the bridging portions comprises a plurality of separated sub-tracks.

3. A touch panel comprising:
a transparent substrate;
a layer of transparent conducting material on the transparent substrate, the layer of transparent conducting material being provided in a pattern comprising a plurality of electrode cells, wherein the electrode cells are connected together within the layer along a first direction and are isolated from each other in the layer by gaps between the electrode cells in a second direction;
a pattern of transparent insulating material on the layer of transparent conducting material, the pattern being such as to provide bridging portions of the transparent insulating material that span across at least a subset of the gaps between the electrode cells in the second direction; and
a plurality of electrically conductive tracks, each track being provided over a respective one of the bridging portions of the transparent insulating material to electrically connect a respective two of the electrode cells across the gap between the electrode cells and wherein each track comprises a plurality of separated sub-tracks.

4. The touch panel of clause 3, wherein the electrically conductive tracks are transparent electrically conductive tracks.

5. The touch panel of clause 4, wherein each of the electrically conductive tracks comprise a plurality of at least one of nanowires, nanotubes and nanosheets.

6. The touch panel of clause 1, 2 or 5 wherein the nanowires, nanotubes or nanosheets comprise silver nanowires, carbon nanotubes or graphene nanosheets.

7. The touch panel of any one of clauses 2-6, wherein, for each of one or more of the tracks, the sub-tracks comprise at least three separated sub-tracks, and wherein the separation between sub-tracks in at least two pairs of adjacent sub-tracks is different.

8. The touch panel of clause 7, wherein, for each of one or more of the tracks, the separations between sub-tracks in every pair of adjacent sub-tracks are different.

9. The touch panel of clauses 7 or 8, wherein, for each of one or more of the tracks, the separation between each pair of adjacent sub-tracks is between 50% and 250% of a width of each sub-track of the pair.

10. The touch panel of any preceding clause, wherein the transparent insulating material comprises material suitable for curing by exposure to ultraviolet radiation.

11. A method for providing a transparent interconnecting structure in a touch panel, the method comprising, onto a layer of transparent conducting material on the transparent substrate, the layer of transparent conducting material being provided in a pattern comprising a plurality of electrode cells, wherein the electrode cells are connected together within the layer along a first direction and are isolated from each other in the layer by gaps between the electrode cells in a second direction:
depositing a pattern of transparent insulating material such as to provide bridging portions of the transparent insulating material that span across at least a subset of the gaps between the electrode cells in the second direction; and depositing a plurality of electrically conductive tracks, each track being provided over a respective one of the bridging portions of the transparent insulating material to electrically connect a respective two of the electrode cells across the gap between the electrode cells;

wherein the depositing of the plurality of electrically conductive tracks is performed on a portion of the deposited pattern of transparent insulating material whilst at the same time the depositing of a further portion of the pattern of transparent insulating material is performed.

12. The method of clause 11, wherein the depositing of the pattern of transparent insulating material comprises a depositing a first bridging portion of transparent insulating material extending between two adjacent electrically isolated cells, followed by depositing a second bridging portion of transparent insulating material extending between another two adjacent electrically isolated cells, and wherein the depositing of the plurality of conductive tracks comprises depositing a first track on the first bridging portion of transparent insulating material, whilst the second bridging portion of transparent insulating material is being deposited.

13. The method of clause 11, wherein the depositing of the pattern of transparent insulating material comprises depositing a first portion of the pattern of transparent insulating material to bridge adjacent electrically isolated cells of a first set of electrically isolated cells and depositing a second portion of the pattern to bridge adjacent electrically isolated cells of a second set of electrically isolated cells, and wherein the depositing of the plurality of conductive tracks comprises depositing a first set of tracks on the first portion of the pattern of transparent insulating material, whilst the second portion of the transparent insulating material is being deposited.

14. The method of any one of clauses 11-13, comprising curing at least a portion of the pattern of transparent insulating material prior to the deposition of the electrically conductive tracks.

15. The method of clause 14, wherein the curing comprises irradiating the pattern of transparent insulating material with ultraviolet radiation.

16. The method of any one of clauses 11-15, comprising drying at least a portion of the electrically conductive tracks.

17. The method of any one of clauses 11-16, wherein the plurality of electrically conductive tracks are transparent.

18. The method of any one of clauses 11-17, comprising processing a surface of the transparent conducting layer prior to deposition of the pattern of transparent conducting material.

19. The method of any one of clauses 11-18, wherein each of the plurality of electrically conductive tracks comprise a plurality of at least one of transparent electrically conductive nanowires, nanotubes or nanosheets.

20. The method of any one of clauses 11-19, wherein depositing the plurality of electrically conductive tracks comprises, for each bridging portion, depositing a plurality of separated sub-tracks.

21. An apparatus for providing a transparent bridge interconnect structure in a touch panel, the apparatus comprising:

means for holding a substrate with a layer of transparent conducting material thereon;

a first deposition unit configured to deposit an insulating material;

a second deposition unit configured to deposit an electrically conductive material;

a position control means for adjusting the position of the first and second deposition units and the substrate relative to one another; and a controller configured to control operation of the first and second deposition units and the position control means such that the first and second deposition units are constrained to move together with one another relative to the transparent conducting layer, and wherein the controller is configured to control the first deposition unit and second deposition unit such that they both deposit their respective materials at the same time on different portions of the transparent conducting layer.

22. The apparatus of clause 21, further comprising a surface processing unit configured to process the surface of the transparent conducting layer, and wherein the controller is configured to control the surface processing unit such that at least a portion of the surface is processed prior to deposition of the transparent insulating material thereon.

23. The apparatus of any one of clauses 21-22, further comprising a curing unit configured to cure a portion of the transparent insulating material deposited by the first unit, and wherein the controller is configured to control the curing unit so as to operate following deposition of the transparent insulating material by the first unit, but prior to deposition of the electrically conducting material, on any given portion of the transparent conductive layer on the substrate.

24. The apparatus of clause 23, wherein the curing unit comprises an ultraviolet radiation source configured to direct ultraviolet radiation towards the transparent insulating material.

25. The apparatus of any one of clauses 21-24, further comprising a drying unit configured to dry a portion of the electrically conductive material deposited by the second unit, and wherein the controller is configured to control the drying unit so as to operate following deposition of the electrically conductive material by the second unit.

26. The apparatus of any one of clauses 21-26, wherein the first unit comprises an ink jet printing unit.

27. The apparatus of any one of clauses 21-26, wherein the second unit comprises a nozzle and a means for forcing the electrically conductive material through the nozzle.

28. The apparatus of any one of clauses 21-28, further comprising a laser unit configured to form to a plurality of discrete electrode cells, which are electrically connected in a first direction but electrically isolated in a second direction, by means of laser cutting.

The invention claimed is:

1. A method for providing a transparent interconnecting structure in a touch panel, the method comprising, onto a layer of transparent conducting material on the transparent substrate, the layer of transparent conducting material being provided in a pattern comprising a plurality of electrode cells, wherein the electrode cells are connected together within the layer along a first direction and are isolated from each other in the layer by gaps between the electrode cells in a second direction:

depositing a pattern of transparent insulating material such as to provide bridging portions of the transparent insulating material that span across at least a subset of the gaps between the electrode cells in the second direction; and depositing a plurality of electrically conductive tracks, each track being provided over a respective one of the bridging portions of the transparent insulating material to electrically connect a respective two of the electrode cells across the gap between the electrode cells;

wherein the depositing of the plurality of electrically conductive tracks is performed on a portion of the deposited pattern of transparent insulating material whilst at the same time the depositing of a further portion of the pattern of transparent insulating material is performed.

2. The method of claim 1, wherein the depositing of the pattern of transparent insulating material comprises a depositing a first bridging portion of transparent insulating material extending between two adjacent electrically isolated cells, followed by depositing a second bridging portion of transparent insulating material extending between another two adjacent electrically isolated cells, and wherein the depositing of the plurality of conductive tracks comprises depositing a first track on the first bridging portion of transparent insulating material, whilst the second bridging portion of transparent insulating material is being deposited.

3. The method of claim 1, wherein the depositing of the pattern of transparent insulating material comprises depositing a first portion of the pattern of transparent insulating material to bridge adjacent electrically isolated cells of a first set of electrically isolated cells and depositing a second portion of the pattern to bridge adjacent electrically isolated cells of a second set of electrically isolated cells, and wherein the depositing of the plurality of conductive tracks comprises depositing a first set of tracks on the first portion of the pattern of transparent insulating material, whilst the second portion of the transparent insulating material is being deposited.

4. The method of claim 1, comprising curing at least a portion of the pattern of transparent insulating material prior to the deposition of the electrically conductive tracks.

5. The method of claim 4, wherein the curing comprises irradiating the pattern of transparent insulating material with ultraviolet radiation.

6. The method of claim 1, comprising drying at least a portion of the electrically conductive tracks.

7. The method of claim 1, wherein the plurality of electrically conductive tracks are transparent.

8. The method of claim 1, comprising processing a surface of the transparent conducting layer prior to deposition of the pattern of transparent conducting material.

9. The method of claim 1, wherein each of the plurality of electrically conductive tracks comprise a plurality of at least one of transparent electrically conductive nanowires, nanotubes or nanosheets.

10. The method of claim 1, wherein depositing the plurality of electrically conductive tracks comprises, for each bridging portion, depositing a plurality of separated sub-tracks.

11. An apparatus for providing a transparent bridge interconnect structure in a touch panel, the apparatus comprising:

means for holding a substrate with a layer of transparent conducting material thereon;

a first deposition unit configured to deposit an insulating material;

a second deposition unit configured to deposit an electrically conductive material;

a position control means for adjusting the position of the first and second deposition units and the substrate relative to one another; and a controller configured to control operation of the first and second deposition units and the position control means such that the first and second deposition units are constrained to move together with one another relative to the transparent conducting layer, and wherein the controller is configured to control the first deposition unit and second deposition unit such that they both deposit their respective materials at the same time on different portions of the transparent conducting layer.

12. The apparatus of claim 11, further comprising a surface processing unit configured to process the surface of the transparent conducting layer, and wherein the controller is configured to control the surface processing unit such that at least a portion of the surface is processed prior to deposition of the transparent insulating material thereon.

13. The apparatus of claim 11, further comprising a curing unit configured to cure a portion of the transparent insulating material deposited by the first unit, and wherein the controller is configured to control the curing unit so as to operate following deposition of the transparent insulating material by the first unit, but prior to deposition of the electrically conducting material, on any given portion of the transparent conductive layer on the substrate.

14. The apparatus of claim 13, wherein the curing unit comprises an ultraviolet radiation source configured to direct ultraviolet radiation towards the transparent insulating material.

15. The apparatus of claim 11, further comprising a drying unit configured to dry a portion of the electrically conductive material deposited by the second unit, and wherein the controller is configured to control the drying unit so as to operate following deposition of the electrically conductive material by the second unit.

16. The apparatus of claim 11, wherein the first unit comprises an ink jet printing unit.

17. The apparatus of claim 11, wherein the second unit comprises a nozzle and a means for forcing the electrically conductive material through the nozzle.

18. The apparatus of claim 11, further comprising a laser unit configured to form to a plurality of discrete electrode cells, which are electrically connected in a first direction but electrically isolated in a second direction, by means of laser cutting.

* * * * *